(12) United States Patent
Ducousso et al.

(10) Patent No.: US 11,060,860 B2
(45) Date of Patent: Jul. 13, 2021

(54) METHOD OF INSPECTION BY GUIDED WAVES

(71) Applicants: SAFRAN, Paris (FR); COMMISSARIAT A L'ENERGIE ATOMIQUE ET AUX ENERGIES ALTERNATIVES, Paris (FR)

(72) Inventors: Mathieu Loic Ducousso, Moissy-Cramayel (FR); Frederic Jenson, Moissy-Cramayel (FR); Bastien Jacques Chapuis, Moissy-Cramayel (FR); Guillemette Danielle Joelle Marie Ribay, Bourg la Reine (FR); Laura Taupin, Orsay (FR)

(73) Assignees: SAFRAN, Paris (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 239 days.

(21) Appl. No.: 16/464,192

(22) PCT Filed: Nov. 23, 2017

(86) PCT No.: PCT/FR2017/053237
§ 371 (c)(1),
(2) Date: May 24, 2019

(87) PCT Pub. No.: WO2018/096285
PCT Pub. Date: May 31, 2018

(65) Prior Publication Data
US 2020/0149881 A1 May 14, 2020

(30) Foreign Application Priority Data
Nov. 25, 2016 (FR) ...................................... 1661518

(51) Int. Cl.
*G01B 17/02* (2006.01)
*G01N 29/24* (2006.01)
(Continued)

(52) U.S. Cl.
CPC .......... *G01B 17/02* (2013.01); *G01N 29/041* (2013.01); *G01N 29/24* (2013.01); *G01N 29/30* (2013.01);
(Continued)

(58) Field of Classification Search
CPC ............. G01B 17/02; G01N 2291/101; G01N 2291/102; G01N 2291/0231;
(Continued)

(56) References Cited

U.S. PATENT DOCUMENTS 5,408,881 A * 4/1995 Piche ..................... G01N 29/07
73/582
5,812,261 A * 9/1998 Nelson ............... G01B 11/0666
356/318

(Continued)

FOREIGN PATENT DOCUMENTS

EP      EP-2440140 B1 *  4/2013  .......... A61B 8/0875
JP      7-120248 A        5/1995

OTHER PUBLICATIONS

International Search Report dated Mar. 13, 2018 in PCT/FR2017/053237 filed on Nov. 23, 2017.
(Continued)

*Primary Examiner* — David L Singer
(74) *Attorney, Agent, or Firm* — Oblon, McClelland, Maier & Neustadt, L.L.P.

(57) ABSTRACT

A method of non-destructively inspecting an adhesively bonded assembly of first, second, and third materials includes generating guided waves in the adhesively bonded assembly and establishing a dispersion curve plot in a first (Continued)

reference frame on the basis of receiving the guided waves. The method further includes comparing the dispersion curve plot with a plurality of reference dispersion curves established in the first reference frame, each of the reference dispersion curves being obtained by generating guided waves in a reference adhesively bonded assembly. Finally, the method includes estimating at least one of the thicknesses of the materials in the adhesively bonded assembly under inspection.

9 Claims, 2 Drawing Sheets

(51) Int. Cl.
*G01N 29/30* (2006.01)
*G01N 29/44* (2006.01)
*G01N 29/46* (2006.01)
*G01N 29/04* (2006.01)

(52) U.S. Cl.
CPC ..... *G01N 29/4409* (2013.01); *G01N 29/4427* (2013.01); *G01N 29/46* (2013.01); *G01N 2291/0231* (2013.01); *G01N 2291/02854* (2013.01); *G01N 2291/0427* (2013.01); *G01N 2291/101* (2013.01); *G01N 2291/102* (2013.01); *G01N 2291/2632* (2013.01); *G01N 2291/2638* (2013.01); *G01N 2291/2694* (2013.01)

(58) Field of Classification Search
CPC ... G01N 2291/0427; G01N 2291/2632; G01N 2291/2638; G01N 2291/2694; G01N 2291/02854; G01N 29/24; G01N 29/30; G01N 29/041; G01N 29/46; G01N 29/4409; G01N 29/4427
See application file for complete search history.

(56) References Cited

U.S. PATENT DOCUMENTS

| | | | | |
|---|---|---|---|---|
| 6,092,421 | A * | 7/2000 | Bar-Cohen | G01N 29/041 73/621 |
| 6,182,512 | B1 * | 2/2001 | Lorraine | G01N 21/1702 73/602 |
| 6,247,367 | B1 * | 6/2001 | Bar-Cohen | G01N 29/041 73/620 |
| 6,587,213 | B1 * | 7/2003 | Knight | G01H 1/04 356/241.2 |
| 2005/0268720 | A1 * | 12/2005 | Quarry | G01N 29/262 73/627 |
| 2010/0286921 | A1 * | 11/2010 | Lee | G01V 1/28 702/17 |
| 2012/0111116 | A1 * | 5/2012 | Minonzio | G01N 29/46 73/597 |
| 2013/0278578 | A1 * | 10/2013 | Vetsuypens | G09G 5/02 345/207 |
| 2013/0289895 | A1 * | 10/2013 | Maev | G01N 29/4436 702/39 |
| 2015/0135836 | A1 * | 5/2015 | Rose | G01N 29/04 73/597 |
| 2017/0234837 | A1 * | 8/2017 | Hall | G01N 29/2431 73/602 |
| 2018/0003680 | A1 * | 1/2018 | Kannajosyula | G01N 29/262 |

OTHER PUBLICATIONS

Wu, T.-T. et al., "Inverse determinations of thickness and elastic properties of a bonding layer using laser-generated surface waves," Elsevier, Ultrasonics, vol. 37, 1999, pp. 23-30.

Moreno, E. et al., "Thickness measurement in composite materials using lamb waves Viscoelastic effects," Elsevier, Ultrasonics, vol. 37, 2000, pp. 595-599.

* cited by examiner

METHOD OF INSPECTION BY GUIDED WAVES

FIELD OF THE INVENTION

The invention relates to the field of non-destructively inspecting assemblies of differing materials, and in particular to the field of non-destructively inspecting structural adhesive bonds that are configured to assemble differing materials together so as to enable mechanical forces to be taken up.

By way of example, such structural adhesive bonds find an application in the field of aviation, where they enable differing materials, which may potentially present complex shapes, to be assembled together in secure and effective manner by means of a layer of adhesive material and without making the structure heavier nor significantly increasing manufacturing costs.

STATE OF THE PRIOR ART

At present there does not exist a tried and tested non-destructive inspection method that serves to guarantee the mechanical strength of an assembly of differing materials that are assembled together by adhesive bonding.

Existing solutions for inspecting bonding between two materials by means of a layer of adhesive material presently consist in periodically taking samples in order to perform destructive measurements.

Various studies have been undertaken in order to find a non-destructive method, running from measuring X-ray absorption to using ultrasound waves in reflection mode. Nevertheless, given firstly the great similarity, in particular in the field of aviation, between the mechanical characteristics of the adhesive material and of the materials being bonded together, such as organic matrix composites, and also given the characteristic thicknesses under consideration, such methods do not make it possible to comply in satisfactory manner with the effectiveness and reliability requirements for such inspections.

Furthermore, for an application in the field of aviation, e.g. inspecting adhesive bonding between materials constituting a blade, it is very difficult or even impossible to model such a part in satisfactory manner, and consequently to predict the behavior of ultrasound signals by computer, given the complexity of the shape of such a part, which generally presents a curved shape.

SUMMARY OF THE INVENTION

The present disclosure relates to a non-destructive inspection method that is simple to perform, fast, and robust, and that makes it possible in an industrial environment to inspect an adhesively bonded assembly of differing materials.

The invention thus provides a non-destructive inspection method for non-destructively inspecting an adhesively bonded assembly of a first material having a first thickness, a top face, and a bottom face, of a second material having a second thickness and a top face, and of an adhesive third material having a third thickness, the adhesive third material being arranged between the bottom face of the first material and the top face of the second material so as to assemble the first and second materials together by adhesive bonding, the method comprising:
  a step in which an ultrasound transducer is placed on the top face of the first material;
  a step in which guided waves are generated in the adhesively bonded assembly;
  a step in which a dispersion curve plot is established in a first reference frame on the basis of receiving the guided waves generated in the adhesively bonded assembly;
  a step in which a plurality of reference dispersion curves are provided that have been established in the first reference frame, each of said reference dispersion curve being obtained by generating guided waves in a reference assembly of the first and second materials bonded together by the adhesive third material, the adhesively bonded reference assembly presenting calibrated thicknesses;
  a step in which the dispersion curve plot of the adhesively bonded assembly under inspection is compared with said plurality of reference dispersion curves; and
  a step in which at least one of the first, second, and third thicknesses in the adhesively bonded assembly under inspection is estimated.

It can thus be understood that the adhesively bonded assembly for inspection is a three-layer assembly of the first, second, and third materials, the adhesive third material extending between the first and second materials in order to assemble them together by adhesive bonding.

In known manner, the ultrasound transducer comprises elements in alignment that operate in emission mode and in reception mode.

In known manner, contact between the ultrasound transducer and the top face of the first material is established via the means that are conventionally used when performing ultrasound inspection for providing viscous or liquid coupling.

Using guided ultrasound waves thus makes it possible to obtain a dispersion curve plot relating to the adhesively bonded assembly for inspection; by extracting the signals received by the receiver elements of the ultrasound transducer it is thus possible to obtain a map of energy levels in a first reference frame. By way of example, this map may be in the form of a representation provided by colors or gray levels showing the energy at each point in said first reference frame. High energy curve lines, referred to as "trajectories", are seen to appear therein, each representing a vibratory mode and together forming a characteristic for the propagation medium, specifically the adhesively bonded assembly for inspection. By comparing this dispersion curve plot with a set of reference dispersion curves established in said first reference frame, it is thus possible to approximate the characteristics of the adhesively bonded assembly for inspection with those of one of the reference adhesively bonded assemblies, so as to estimate the characteristics of the adhesively bonded assembly for inspection, and more particularly so as to estimate at least one of the thicknesses of the first, second, and third materials.

The term "reference dispersion curve" is used to mean dispersion curves that are obtained in similar manner to the dispersion curve plot established for the adhesively bonded assembly for inspection, and in particular established in the same first reference frame as that selected for the dispersion curve plot, the reference dispersion curves being obtained by generating guided ultrasound waves in the reference adhesively bonded assemblies of the first, second, and third materials.

It is known how to establish the dispersion curve plot and the reference dispersion curves from guided waves emitted into a given material, and this is described in particular in Document EP 2 440 140. By way of example, and in non-limiting manner, the dispersion curve plots and the reference dispersion curves may be obtained by performing a two-dimensional Fourier transform (2D-FFT) from a single acquisition in which the emitter elements of the ultrasound transducer emit an ultrasound signal and in which the receiver elements detect the ultrasound signal that has propagated through the adhesively bonded assembly of the first, second, and third materials; alternatively, the plots and the reference dispersion curves may be obtained by taking a series of successive acquisitions in which the emitter elements of the ultrasound transducer emit the ultrasound signal, with the receiver elements detecting the signal with the emitter elements being varied between two successive acquisitions, and with an approach of the singular value decomposition (SVD) type then being applied.

The method of the present invention thus makes it possible in non-destructive manner, and in particular without having recourse to computer simulation of the adhesively bonded assembly for inspection, to estimate the characteristics of the assembly that are to be inspected, and in particular to estimate at least one of the thicknesses of the first, second, and third materials.

Alternatively, the method of the present invention can be made even easier to perform in that it is possible to use any type of representation base for the ultrasound signals (measurement and reference).

The method of the present invention thus constitutes a method that is robust and effective for inspecting, in non-destructive manner, the characteristics of an adhesively bonded assembly for inspection, and by way of example and in non-limiting manner, when the third material is an adhesive material configured to assemble together the first and second materials by adhesive bonding, for inspecting the thickness of the layer of said adhesive third material, and consequently the strength with which the first and second materials are assembled together by the adhesive third material.

The invention is set out below in a series of variant implementations, which may be considered singly or in combination with one or more of the preceding variants.

In certain implementations, the method further comprises a step of identifying, from among said plurality of reference dispersion curves, the reference dispersion curve that presents the greatest similarity with the dispersion curve plot of the inspected assembly.

In certain implementations, the step of identifying the reference dispersion curve having the greatest similarity with the dispersion curve plot of the assembly under inspection is performed by an image comparison method.

The use of an image comparison method makes it possible, from among the reference dispersion curves, to identify easily and quickly the reference curve that has characteristics that are the closest to the characteristics of the dispersion curve plot, and consequently, from among the reference adhesively bonded assemblies from which the reference dispersion curves were obtained, to identify the assembly in which the materials present characteristics that are the closest to those of the adhesively bonded assembly for inspection.

In certain implementations, said image comparison method comprises a search algorithm of the structural similarity index type. Such an algorithm is described in particular in the document "Image quality assessment: from error visibility to structural similarity" (IEEE Transactions on Image Processing, Vol. 13, No. 4, April 2004).

Alternatively, other image comparison methods may be used, such as a feature similarity index for image (FSIM) type algorithm. It is also possible to have recourse to relevance vector machine (RVM) or convolutional neural network (CNN) type classification methods, or indeed to logistic regression methods.

In certain implementations, the method further includes a step of iteratively optimizing a comparison zone for the dispersion curve plot of the assembly under inspection that is adapted for comparing said dispersion curve plot of the adhesively bonded assembly under inspection with said plurality of reference dispersion curves.

By means of this provision, those ranges of magnitudes represented in the dispersion curve plot that serve to improve the effectiveness of the comparison of said dispersion curve plot with said plurality of reference dispersion curves are determined in such a manner as to improve the effectiveness of the inspection method of the present invention.

In certain implementations, each of said reference dispersion curves is prepared by averaging a plurality of dispersion curves obtained from generating a plurality of guided waves on said corresponding reference adhesively bonded assembly.

This disposition serves to reduce the influence of external parameters such as which operator is obtaining the dispersion curves, temperature, the acquisition system used, . . . .

In certain implementations, the ultrasound transducer placed on the top face of the first material comprises emitter elements and receiver elements that are directly adjacent to the emitter elements.

By this provision, the quality of the image of the dispersion curve plot and the quality of the reference dispersion curves is improved; in particular, the continuity and the uniformity of the resulting curves are improved, thereby contributing to the effectiveness of the inspect method of the present invention.

In certain implementations, the top face presents a curved shape, and the ultrasound transducer presents properties of sufficient flexibility to enable it to match the shape of the top face of the first material.

Thus, the use of a flexible ultrasound transducer makes it possible to inspect adhesively bonded assemblies that are complex in shape, such as a blade, e.g. when the inspection method is used in the field of aviation.

In certain implementations, the first reference frame is a frequency-wave number reference frame.

Alternatively, it is possible to use a reference frame of space-time type or a reference frame of frequency-propagation speed type.

In a particular embodiment, the various steps of the inspection method for the present invention are determined by computer or microprocessor program instructions.

Consequently, the invention also provides a computer or microprocessor program on a data medium, the program being suitable for being performed in an inspection device, or more generally in a computer or by a microprocessor, the program including instructions adapted to performing steps of a non-destructive inspection method as described above.

The program may use any programming language and may be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means such as a read only memory (ROM), e.g.

a compact disk (CD) ROM, or a microelectronic circuit ROM, or indeed magnetic recording means, e.g. a floppy disk or a hard disk or a DVD.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

The invention and its advantages can be better understood on reading the following detailed description of an implementation of the invention given as non-limiting example. The description refers to the sheets of the accompanying figures, in which.

DETAILED DESCRIPTION OF IMPLEMENTATIONS

Figure 1:
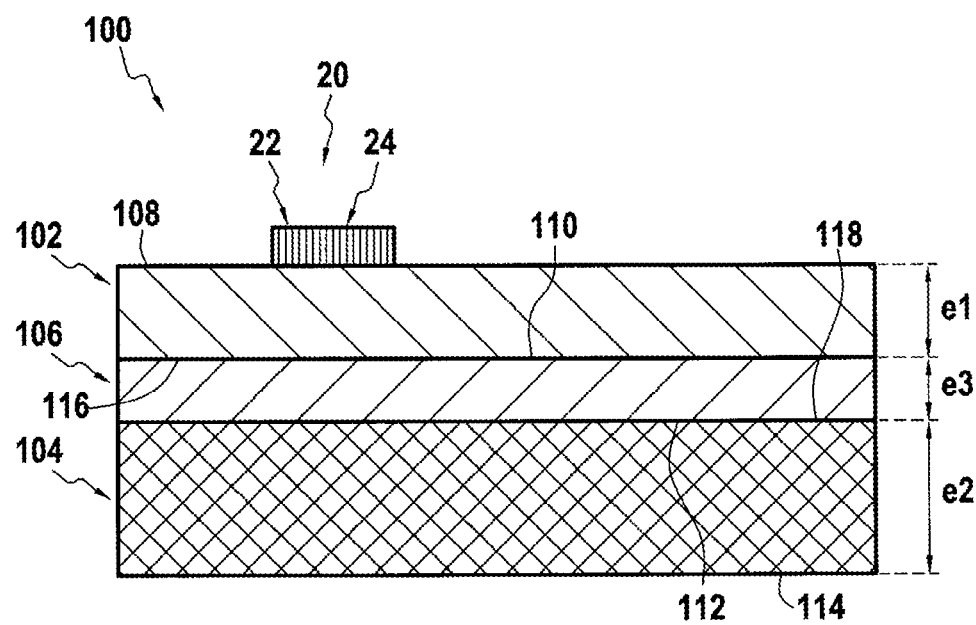
FIG. 1 is a diagram showing an example of an adhesively bonded assembly of materials for inspection.

FIG. 1 is a diagram of an adhesively bonded assembly 100 of differing materials to which the non-destructive inspection method of the present invention is applied.

By way of example and in non-limiting manner, the adhesively bonded assembly 100 comprises a top layer constituted by a first material 102 having a first thickness e1 and a bottom layer constituted by a second material 104 having a second thickness e2; between the first and second materials 102 and 104, there extends a third material 106 that is adhesive, being configured to hold the first and second materials 102 and 104 together, and that presents a third thickness e3.

The first material 102 has a top face 108 and a bottom face 110, and the second material 104 has a top face 112 and a bottom face 114; the adhesive third material 106 has a top face 116 placed against the bottom face 110 of the first material 102, and a bottom face 118 placed against the top face 112 of the second material 104.

By way of example and in non-limiting manner, the second material 104 is a composite material of thickness e2 lying in the range 3 millimeters (mm) to 100 mm.

In other implementations, the first material 102 is of titanium type, being of thickness e1 that preferably lies in the range 100 micrometers (µm) to 1000 µm.

By way of example and in non-limiting manner, the adhesive third material 106 presents a third thickness e3 that lies in the range 50 µm to 350 µm.

In the diagrammatic example of FIG. 1, the materials 102, 104, and 106 are of rectilinear profile and of constant thickness, however the inspection method of the present invention could naturally be applied to any other type of material profile, and in particular to materials presenting a profile that is complex, such as a curved profile.

Figure 3:
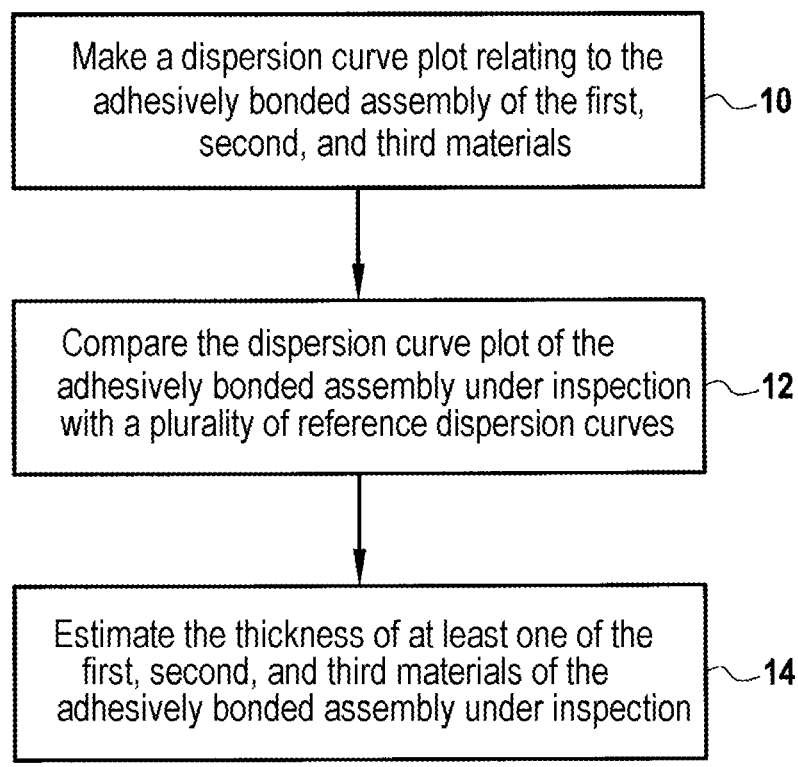
FIG. 3 is a diagram showing the main steps of an inspection method of the present invention.

As shown in the diagram of FIG. 3, the non-destructive inspection method of the present invention for inspecting the assembly 100 begins with a first step 10 in which a dispersion curve plot is established relating to the adhesively bonded assembly 100 for inspection.

For this purpose, and as shown in FIG. 1, a first ultrasound transducer 20 is placed on the top surface 108 of the first material 102.

The ultrasound transducer 20 has emitter elements 22 and receiver elements 24.

In certain implementations, the emitter elements 22 are directly adjacent to the receiver elements 24; in other words, and unlike the ultrasound transducers known in the prior art, and in particular as disclosed in above-mentioned Document EP 2 440 140, the ultrasound transducer 20 used for performing the method of the present invention does not have any barrier-forming gap between the emitter elements 22 and the receiver elements 24.

In order to enable the method of the present invention to be performed on the adhesively bonded assembly 100 for inspection, in which the top face 108 of the first material 102 presents a profile that is complex, such as a curved profile, the ultrasound transducer 20 may present flexibility characteristics that enable it to match the shape of the first material 102.

Once the ultrasound transducer 20 has been placed on the assembly 100, guided ultrasound waves, such as Lamb waves, for example, are generated by the emitter elements 22 so as to be guided in the assembly 100.

On the basis of the signals received by the receiver elements 24, a dispersion curve plot relating to said assembly 100 is drawn up in a first reference frame.

Figure 2:
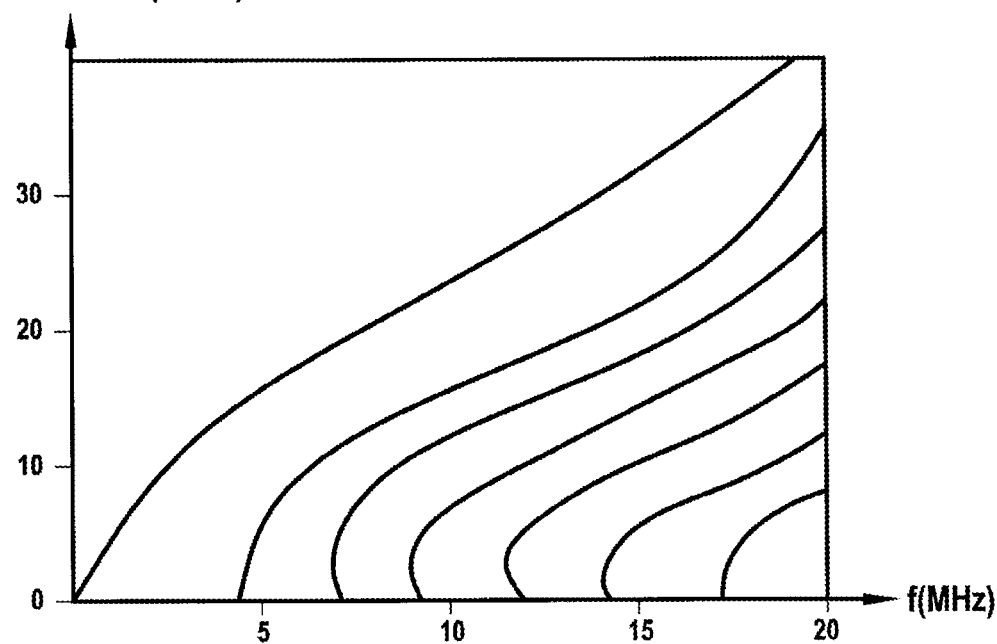
FIG. 2 is a diagram plotting example dispersion curves of an adhesively bonded assembly of materials for inspection.

By way of example and in non-limiting manner, as shown in FIG. 2, the first reference frame may be of the frequency-wave number type, however, for the purpose of establishing a dispersion curve plot on the basis of signals picked up by the receiver elements 24 of the ultrasound transducer 20, it is equally possible to devise other types of reference frame, such as space-time or frequency-propagation speed reference frames.

Thereafter, and as shown in the diagram of FIG. 3, the resulting dispersion curve plot is compared with a plurality of reference dispersion curves.

The term "reference dispersion curve" is used to mean dispersion curves that have been obtained in similar manner to the above-described dispersion curve plot, and in particular that are established in the same first reference frame as that selected for the dispersion curve plot, the reference dispersion curves being made by generating guided ultrasound waves in reference adhesively bonded assemblies of the first, second, and third materials 102, 104, and 106.

In particular, if the purpose of the non-destructive inspection performed by the method of the present invention is to determine the thickness e3 of the adhesive third material 106, with the other parameters being known, the reference assemblies from which the reference dispersion curves are taken differ from one another solely by the thickness e3 of the adhesive third material 106.

In similar manner, if the inspection being performed seeks to inspect an assembly in which the first and third materials 102 and 106 present thicknesses that vary and that are not known, the reference assemblies from which the reference dispersion curves are obtained differ from one another by the thickness e3 of the third material 106 and by the thickness e1 of the first material 102.

By extension, the method of the present invention may also serve to measure the thicknesses e1, e2, e3 of differing materials 102, 104, and 106 of the adhesively bonded assembly 100 for inspection if reference dispersion curves have been obtained from reference assemblies in which the thicknesses of all three materials vary. Furthermore, in order to enable the second thickness e2 of the second material 104 to be measured, it needs to be sufficiently thin to enable ultrasound waves to be reflected acoustically on the bottom face 114 and then detected by the receiver elements 24 of the ultrasound transducer 20.

It is also possible to envisage using the method of the present invention for inspecting an assembly comprising more than three materials.

The various reference dispersion curves making up the database having elements for comparing with the dispersion curve plot obtained from the adhesively bonded assembly being inspected in the method of the present invention may themselves be obtained, by way of example and in non-limiting manner, by averaging from a plurality of acquisitions made by generating guided waves on the corresponding reference adhesively bonded assembly, thereby limiting the impact of any applicable external conditions while acquisition is being performed.

The step 12 of comparing the dispersion curve plot with the various elements constituting the above-mentioned database is performed, by way of example and in non-limiting manner, by an image comparison method. Such a method may comprise an algorithm of the structural similarity index type, of the feature similarity index for image (FSIM) type; it is also possible to have recourse to relevance vector machine (RVM) type classification methods or to convolutional neural network (CNN) type methods, or indeed to logistic regression methods.

Performing an image comparison method requires a comparison zone to be determined beforehand in the dispersion curve plot of the inspected assembly 100 that is appropriate for comparing said dispersion curve plot with said plurality of reference dispersion curves.

In certain implementations, said comparison zone is determined in iterative manner by applying the image comparison method to a first comparison zone, and then varying the ranges under consideration, e.g. the frequency and/or wave number ranges in the situation shown in FIG. 2, followed by applying the image comparison method once more, until the optimum comparison zone is obtained that makes it possible to compare effectively the dispersion curve plot with the elements of the database of reference dispersion curves.

After comparing the dispersion curve plot with the reference dispersion curves, and once the reference dispersion curve has been identified that presents the greatest similarity with the dispersion curve plot relating to the assembly 100, then, and as shown in FIG. 3, the characteristics of the adhesively bonded assembly 100 for inspection are estimated.

The method thus makes it possible to determine at least one of the thicknesses e1, e2, and e3 of the first, second, and third materials 102, 104, and 106 of the adhesively bonded assembly 100 for inspection (step 14).

For example, the method of the present invention makes it possible to determine the third thickness e3 of the adhesive third material 106 that extends between the first and second materials 102 and 104 in order to assemble said materials together adhesively.

As mentioned above, as a function of the reference adhesively bonded assemblies used for setting up the database, the method can also serve to determine the characteristics relating to the first and second materials 102 and 104, and indeed relating to other materials, with adhesively bonded assemblies 100 for inspection that are more complex.

Given that the method of the present invention makes it possible in particular to determine the third thickness e3 of the adhesive third material 106, the method naturally also serves to detect potential absence of said third material 106 between the first and second materials 102 and 104. For this purpose, the previously-mentioned database must also include elements relating to reference assemblies that do not include a layer of the adhesive third material 106.

Although the present invention is described with reference to specific implementations, it is clear that modifications and changes may be undertaken on those implementations without going beyond the general ambit of the invention as defined by the claims. In particular, individual characteristics of the various implementations that are shown and/or mentioned may be combined in additional implementations. Consequently, the description and the drawings should be considered in a sense that is illustrative rather than restrictive.

It is also clear that all of the characteristics described with reference to a method can be transposed, singly or in combination to a device, and vice versa, that all of the characteristics described with reference to a device can be transposed, singly or in combination to a method.

The invention claimed is:

1. A non-destructive inspection method for non-destructively inspecting an adhesively bonded assembly of a first material having a first thickness, a top face, and a bottom face, of a second material having a second thickness and a top face, and of an adhesive third material having a third thickness, the adhesive third material being arranged between the bottom face of the first material and the top face of the second material so as to assemble the first and second materials together by adhesive bonding, the method comprising:

placing an ultrasound transducer on the top face of the first material;

generating guided waves in the adhesively bonded assembly;

establishing a dispersion curve plot in a first reference frame on the basis of receiving the guided waves generated in the adhesively bonded assembly;

establishing a plurality of reference dispersion curves that are provided in the first reference frame, each of said reference dispersion curves being obtained by generating guided waves in a reference assembly of the first and second materials adhesively bonded by the adhesive third material, the adhesively bonded reference assembly presenting calibrated thicknesses;

iteratively optimizing a comparison zone for the dispersion curve plot of the adhesively bonded assembly under inspection that is adapted for comparing said dispersion curve plot with said plurality of reference dispersion curves;

comparing the dispersion curve plot of the adhesively bonded assembly under inspection with said plurality of reference dispersion curves; and estimating at least one of the first, second, and third thicknesses in the adhesively bonded assembly under inspection.

2. The non-destructive inspection method according to claim 1, further comprising identifying, from among said plurality of reference dispersion curves, the reference dispersion curve that presents the greatest similarity with the dispersion curve plot of the adhesively bonded assembly under inspection.

3. The non-destructive inspection method according to claim 2, wherein the identifying the reference dispersion curve having the greatest similarity with the dispersion curve plot of the assembly under inspection is performed by an image comparison method.

4. The non-destructive inspection method according to claim 3, wherein said image comparison method comprises a search algorithm of the structural similarity index type.

5. The non-destructive inspection method according to claim 1, wherein each of said reference dispersion curves is prepared by averaging a plurality of dispersion curves obtained from generating a plurality of guided waves in the corresponding reference assembly.

6. The non-destructive inspection method according to claim 1, wherein the ultrasound transducer placed on the top face of the first material comprises emitter elements and receiver elements that are directly adjacent to the emitter elements.

7. The non-destructive inspection method according to claim 1, wherein the top face of the first material presents a curved shape, the ultrasound transducer presenting properties of sufficient flexibility to enable it to match the shape of the top face of the first material.

8. The non-destructive inspection method according to claim 1, wherein the first reference frame is a frequency-wave number reference frame.

9. A non-transitory computer-readable storage medium including instructions for executing the non-destructive inspection method according to claim 1 when said instructions are is executed by a computer or by a microprocessor.

* * * * *